United States Patent

Bynum

[11] Patent Number: 5,823,702
[45] Date of Patent: Oct. 20, 1998

[54] FLUID COUPLING AND FASTENER CAPTURE DEVICE

[76] Inventor: Kurt K. Bynum, 7491 Fosdick Rd., Saline, Mich. 48176

[21] Appl. No.: 773,056

[22] Filed: Dec. 24, 1996

Related U.S. Application Data

[63] Continuation-in-part of Ser. No. 335,638, Nov. 8, 1994, Pat. No. 5,586,790, which is a continuation-in-part of Ser. No. 826,005, Jan. 27, 1992, Pat. No. 5,362,110, and Ser. No. 660,645, Feb. 25, 1991, Pat. No. 5,083,819.

[51] Int. Cl.⁶ .................................................. F16L 55/00
[52] U.S. Cl. ........................... 403/320; 403/316; 285/87; 285/82
[58] Field of Search ................................... 403/320, 316, 403/315; 285/82, 92, 87, 81

[56] References Cited

U.S. PATENT DOCUMENTS

| | | |
|---|---|---|
| 315,895 | 4/1885 | Brady . |
| 573,397 | 12/1896 | De Graffenried .................. 403/320 X |
| 1,691,851 | 11/1928 | McCuean . |
| 2,489,919 | 11/1949 | Merriman . |
| 2,731,058 | 1/1956 | Smisko . |
| 2,992,018 | 7/1961 | Rosan . |
| 3,069,187 | 12/1962 | Collins et al. . |
| 3,335,735 | 8/1967 | Colegrove et al. ................. 403/316 X |
| 3,343,852 | 9/1967 | Blight et al. . |
| 3,986,731 | 10/1976 | DeHoff ..................................... 285/81 |
| 4,150,845 | 4/1979 | Riuli et al. ............................... 285/81 |
| 4,801,160 | 1/1989 | Barrington ............................... 285/81 |
| 5,048,872 | 9/1991 | Gehring ................................... 285/92 |
| 5,058,930 | 10/1991 | Schlosser ................................. 285/92 |
| 5,083,819 | 1/1992 | Bynum .................................... 285/89 |
| 5,362,111 | 11/1994 | Bynum .................................... 285/87 |
| 5,586,790 | 12/1996 | Bynum .................................... 285/89 |

*Primary Examiner*—Anthony Knight
*Attorney, Agent, or Firm*—James M. Deimen

[57] ABSTRACT

A new capture device comprising a plurality of axially extending tangs (42) on one (10) of a pair of complementary fittings (10, 14) in a fluid coupling and a polygonal circumferential groove (20) on the other fitting (14) adapted to engage the tangs. Upon rotational engagement of the fittings the tangs (42) engage the polygonal groove (20) and "ratchet" about the junctures between the flats (22) until the coupling is tight. Although not limited to particular materials, the new capture device is particularly suited to very tough, strong and hard materials such as titanium, stainless steel and Inconel alloy because the effectiveness of the capture device is dependent upon the stiffness of the tangs (42). The new device prevents vibrational disassembly of the complementary fittings without preventing disassembly solely with wrenches. Moreover, the complementary fittings and capture device can be repeatedly assembled and disassembled without any damage to the threads (12) or capture device. A variety of configurations of the capture device are illustrated and applications to a bolt and nut, threaded rod and nut and a hole plug (e.g. turbine engine borescope port) are disclosed.

5 Claims, 8 Drawing Sheets

FLUID COUPLING AND FASTENER CAPTURE DEVICE

BACKGROUND OF THE INVENTION

This is a continuation-in-part of application Ser. No. 08/335,638, filed on Nov. 8, 1994, now U.S. Pat. No. 5,586,790 issued Dec. 24, 1996, which is a continuation-in-part of application Ser. No. 07/826,005, filed on Jan. 27, 1992, now U.S. Pat. No. 5,362,110 issued Nov. 8, 1994, and is a continuation-in-part of application Ser. No. 07/660,645, filed on Feb. 25, 1991, now U.S. Pat. No. 5,083,819 issued Jan. 28, 1992.

The field of the invention pertains to fluid tubing couplers and fasteners and, in particular, to fasteners for hydraulic, pneumatic and fuel systems on aircraft wherein unusual and perhaps "exotic" materials are used for weight savings and corrosion resistance. Such fittings are subject to severe vibration and absolutely must not loosen or disassemble during use. As a result military and civilian specifications require assurance that failure will not occur. Conventional construction now requires that the fittings be "wired" and the wires "sealed" to prevent the fasteners from rotating apart during use.

An early patent, U.S. Pat. No. 315,895, discloses a device to retain a packing nut on a valve. The device engages the flats on the nut and is retained by a small screw. U.S. Pat. No. 1,691,851 and more recently U.S. Pat. No. 4,801,160 each disclose a circumferential coil spring having means at one end of the coil spring to engage a ratchet or socket in the member that is to be prevented from rotating.

U.S. Pat. No. 3,343,852 discloses a ball detent device to lock a nut on an electrical connector. The ball detent engages a plurality of grooves in an inside member. U.S. Pat. No. 3,986,731 discloses a tangentially extending external pawl that engages notches in the exterior of the inside member whereas U.S. Pat. No. 3,069,187 discloses an axially extending pawl adapted to engage a plurality of ratchet grooves in the radial face of the other member. Similarly, U.S. Pat. No. 2,489,919, U.S. Pat. No. 2,731,058 and U.S. Pat. No. 4,150,845 all disclose devices that engage ratchet grooves in a radial face on one of the members. U.S. Pat. No. 2,992,018 discloses a circumferential plurality of axial grooves on an inner member and a circumferential plurality of axial grooves on the inside of a nut as axially extended. Splits in the axially extended portion of the nut permit the grooved portion to flexibly expand and ratchet about the inner member.

Most of the devices disclosed above are bulky and complicated with several separate parts or require a complicated geometry be formed on one or both of the members retained to prevent retrograde movement and inadvertent disassembly. Such complications are to be avoided with aircraft couplings and fasteners which are typically formed from expensive, hard, tough and strong metals and alloys. Other common devices rely upon plastic yielding of the threads joining the couplers or fasteners or plastic yielding of a plastic insert. Plastic yielding destroys the reusability of such capture devices after one or a few disassemblies. With a view toward creating a light, compact and simple capture device that can be retrofitted to existing couplings, applicant has developed the new capture device disclosed below.

SUMMARY OF THE INVENTION

The new capture device for fluid fittings and couplings comprises an inside threaded or female fitting formed with an external plurality of flats about the circumference and an outside threaded or male fitting fitted with an external circumferential ring having a plurality of axially parallel tangs adapted to engage the plurality of flats.

The plurality of flats on the female fitting are radially spaced from the axis of the female fitting a distance less than the external radius of the outside of the female fitting between the flats and the engageable end of the female fitting thereby forming a circumferential shoulder adjacent the circumferential plurality of flats.

The male fitting plurality of tangs are spaced radially from the external threads. The tang ring is fitted against a flange on the male fitting. The ring may be one piece and press fit onto a shoulder of greater radius than the external threads or, in particular for retro-fit combinations, the ring is split to fit into an existing thread relief groove in the male fitting. In the retro-fit construction a retaining ring or sleeve is press fit over the split ring. A groove or shoulder is formed in the one piece ring or the sleeve for purposes of disassembly if necessary.

In the particular application for which this capture device was developed, severe vibration and temperatures to about 1000° F. are typically and normally encountered. The new capture device does not engage the threads on the fittings and does not rely on any plastic yielding. Rather, the flexing of the tangs is well within the yield strength of the material. Testing of the capture device shows no degradation of the threads on the fittings, the functional engagement surfaces of the capture device or the flexing tangs over hundreds of cycles of assembly and disassembly of the fittings.

The engagement or disengagement of the fittings and capture device requires no additional tools beyond the two wrenches for the fittings. Relative motion between the wrenches is all that is necessary. The torque required to activate the capture device is significantly less than the specified torque for seating the fully engaged complementary fittings. Thus, a false full torque does not occur. The torsional resistance of the capture device is sufficient to prevent vibrational loosening and thermal cycling loosening of the fittings. Moreover, the shoulder acts as a fail safe check against any disassembly of the fittings so long as at least one tang remains unbroken. This capability is very important in aircraft applications. Moreover, in aircraft applications preferably the number of tangs equals the number of flats.

Although described above in terms of a specific male and female complementary coupling pair, the male and female fittings may be reversed relative to the capture device with the circumferential polygonal flats and shoulder formed on the male fitting and the tangs on the female fitting. Nor is the capture device limited only to the threaded coupling pair disclosed below but the device is also applicable to other types of fittings and fasteners that include relative rotational motion to fully engage. A borescope plug and a bolt and nut are disclosed as examples.

As illustrations of alternative configurations the external plurality of flats may be modified into concave scallops, ratchets, or a circumferential cone for example. The engagement tips of the tangs may also be configured for the particular shape of the external "flats" or for off-center engagement.

DESCRIPTION OF THE PREFERRED EMBODIMENTS

Figure 1:
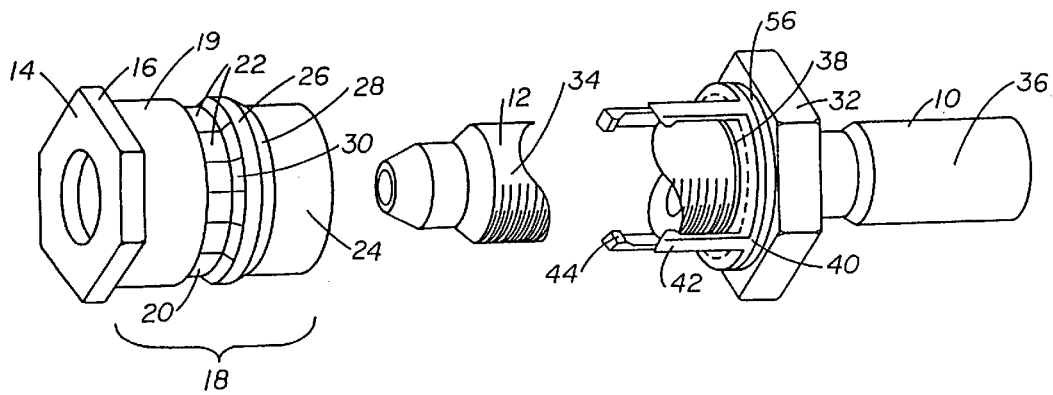
FIG. 1 is an exploded view of the capture device on modified complementary fluid fittings.

Illustrated in FIG. 1 is an exploded view of a fluid coupling comprising a coupling fitting 10 having a threaded male portion 12 and a coupling fitting or a nut with an internally threaded female portion 14. The fitting 10 and nut 14 are permanently attached to lengths of tubing (not shown) in a conventional manner that allows the nut to be rotated relative to the fitting and relative to the tubing entering the nut. Thus, the nut 14 can be screwed on and off the fitting 10.

The nut 14 includes a hexagonal portion 16 for attachment of a wrench and a generally cylindrical portion 18 within which are the internal threads (not shown). Intermediate the length of the cylindrical portion 18 is a circumferential groove 20 or depressed portion formed with a plurality of flats 22 to create a polygonal surface in the groove 20 about the nut. Between the inner end 24 of the nut 14 and the groove 20 is a shoulder 26 having a sloping or bevelled surface 28 facing the inner end 24 and a second bevelled but also flatted surface 30 facing and forming a part of the groove 20. The inner end 24 of the cylindrical portion 18 is of smaller diameter than the portion 19 adjacent the hexagonal portion 16. Although the nut 14 may be formed of other materials for other purposes, the particular application for which the improvements disclosed herein apply require a very hard, tough and strong material such as titanium. As an alternative, to retro-fit an existing nut of relatively soft material, a separate collar or sleeve incorporating the polygonal surface 20 and adjacent bevelled shoulder 30 and made of suitable hard, tough, strong material may be press fit over a smooth generally cylindrical portion corresponding to 18.

Figure 3:
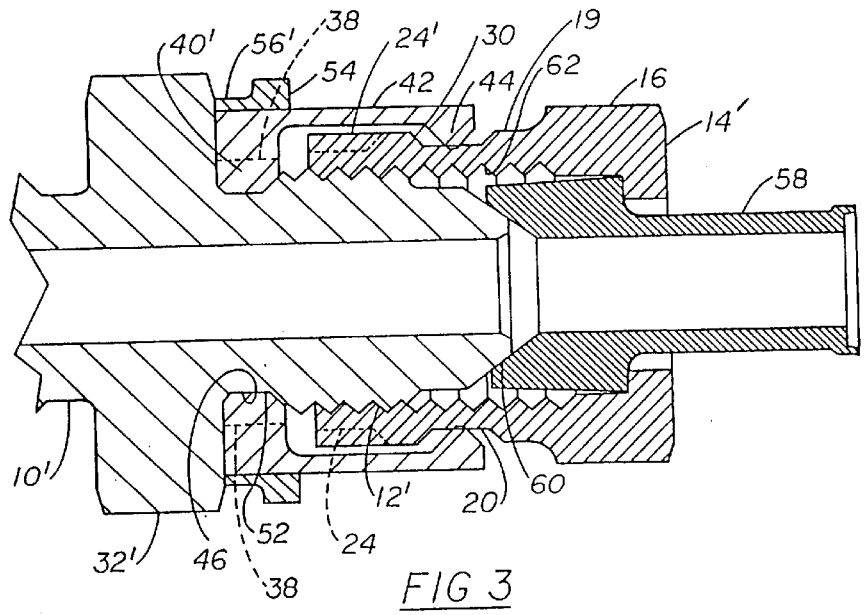
FIG. 3 is a side cross-section of the capture device retro-fitted to the complementary fluid fittings.

In a similar manner the fitting 10 may be formed of other materials for other purposes, but here the particular application requires very hard, tough and strong material such as Inconel alloy, a product of Inco, Inc. (The International Nickel Company). The fitting 10 includes a hexagonal portion 32 for attachment of a wrench with generally cylindrical portions 34 and 36 extending axially to either side of the hexagonal portion 32. The cylindrical portion 34 includes the threaded male portion 12 and a cylindrical shoulder 38 between the threaded portion and the hexagonal portion 32. (Also shown in FIG. 3 is the location of the cylindrical shoulder 38).

Press fit circumferentially about the cylindrical shoulder 38 is a ring 40 having a plurality of axially extending tangs 42 integrally attached to the ring. Each tang 42 is formed with a radially inward directed knob 44. As is more fully disclosed and explained below the knobs 44 on the ends of the tangs 42 are adapted to engage the polygonal groove flats 22 on the nut 14 when the nut 14 and fitting 10 are engaged tightly. On relatively small fittings and capture devices the flats 22 may be slightly concave to emphasize the junctures between the flats and provide better capture of the knobs 44.

Figure 2:
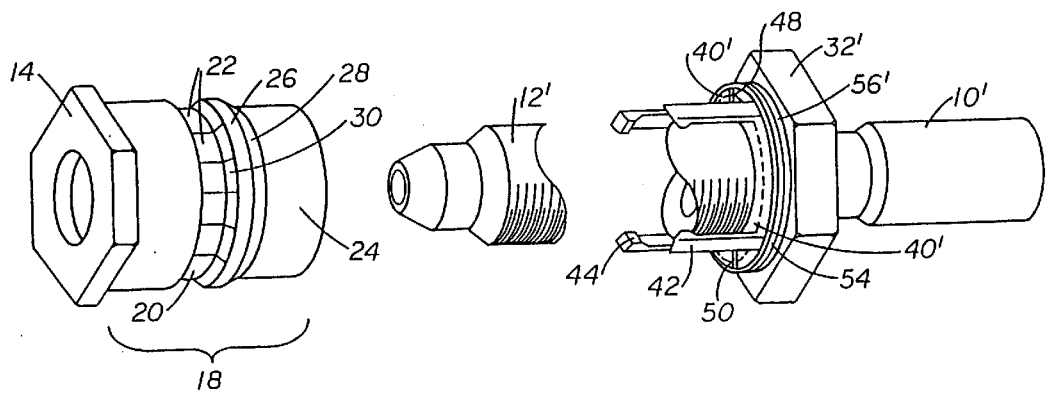
FIG. 2 is an exploded view of the capture device retrofitted to complementary fluid fittings.

In FIG. 2 the nut 14 remains substantially the same as in FIG. 1, however, the capture device is modified to permit retrofit to Inconel fittings 10' currently in use. Referring also to FIG. 3, the fitting 10' includes a relief groove 46 between the hexagonal portion 32' and the threaded portion 12'. To retrofit attach the capture device to the fitting 10', the ring 40' is split at 48 and 50 and modified to fit down into the relief groove 46 as shown at 52. A circumferential retaining ring or sleeve 54 is press fit over the ring 40' to retain the ring halves in tight engagement with the relief groove 46. As above a plurality of tangs 42 extend axially from the ring 40' and are formed with radially inwardly directed knobs 44.

To assist in the removal of the capture device when necessary, a circumferential groove 56' is formed in the exterior of the sleeve 54. In a similar manner an exterior circumferential groove 56 is formed in the ring 40 shown in FIG. 1.

As best shown in FIG. 3 the nut 14' engages a tubing ferrule 58 which in turn is tightly engaged to the fitting 10' at a conical juncture 60 in a conventional manner. The inner end 24' of the nut 14' in FIG. 3 is of the same diameter as the portion 19 and therefore the shoulder 26 and bevel 28 do not separately appear as in FIGS. 1 and 2. The bevel flats 30, however, are formed in the sidewall of the groove 20.

In tightening the nut 14' and ferrule 58 to the fitting 10' the male 12' and female 62 threads are rotatably engaged. As the nut 14' is engaged to the fitting body 10' as best shown in FIG. 3 the tang knobs 44 engage the inner end 24' of the nut 14' flexing outwardly the tangs 42. In the case of the smaller diameter inner end 24 the nut threads engage the fitting threads 12 prior to engagement of the tang knobs 44 with the bevelled surface 28 and flexing over the shoulder 26. The tangs 42 again flex as the knobs 44 engage and pass over the circumferential bevel 30. The tang knobs 44 drop into the polygonal groove 20 and engage the flats 22 as the nut 14' is finally tightened. The tang knobs 44 engage the flats 22 with an interference fit and therefore, as the nut 14' is rotated, the tangs 42 flex and the knobs 44 "ratchet" over the junctures between the flats 22. As disclosed below the flats 22 may be modified in form such as concave scalloped.

Figures 4A, 4B:
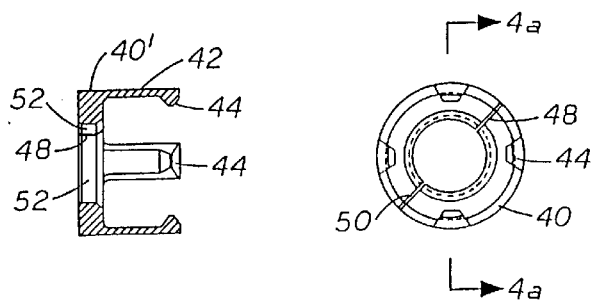
FIGS. 4a and 4b illustrate the separate tang ring of the capture device with FIG. 4a taken along the line 4a—4a in FIG. 4b.
Figures 5A, 5B:
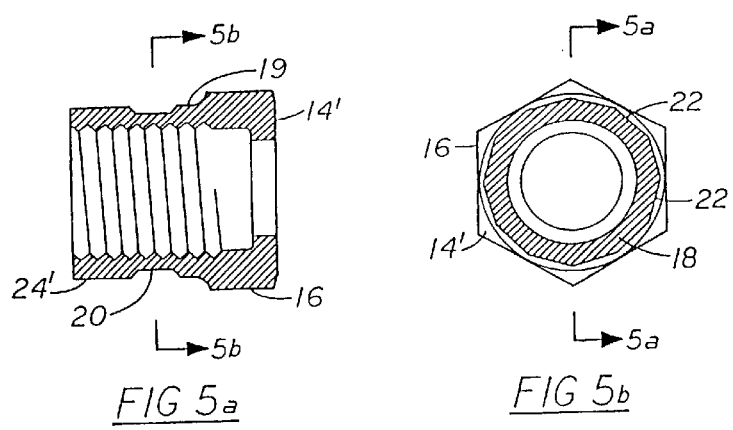
FIGS. 5a and 5b illustrate the nut fitting modified for the capture device with FIG. 5a taken along the line 5a–5a in FIG. 5b and vice versa.

In FIGS. 4a and 4b the capture device split ring 40' and tangs 42 are illustrated separate from the fitting 10 or 10'. In keeping with the titanium nut and Inconel fitting above the split ring 40' and tangs 42 are titanium. In a prototype for test the dimension across the flats of the hexagons 16 and 32 is about three-quarters of an inch and the cylindrical portion 18 of the nut 14 is slightly more than one-half inch in diameter. The interference fit between the tang knobs 44 and the polygonal groove flats 22 is 0.02 inches. The interference fit between the sleeve 54 and the split ring is 0.002 inches. Nevertheless with the high hardness and modulus of elasticity of each of the materials in combination with the configuration of the capture device, the capture device effectively prevents loosening of the nut. In the prototype twelve flats 22 are provided as best shown in FIGS. 5a and 5b wherein the nut 14' is shown separate from the fitting 10 or 10'.

The capture device as above described is made of titanium, however, the tangs and nut fitting need not both be of the same material. Rather, the materials should be compatible for the operating conditions. In particular, the shoulder and groove flats on the nut fitting should be very hard and the tangs very stiff and tough for their size to resist any yielding or permanent set which would reduce the effectiveness of the capture device.

Figure 6:
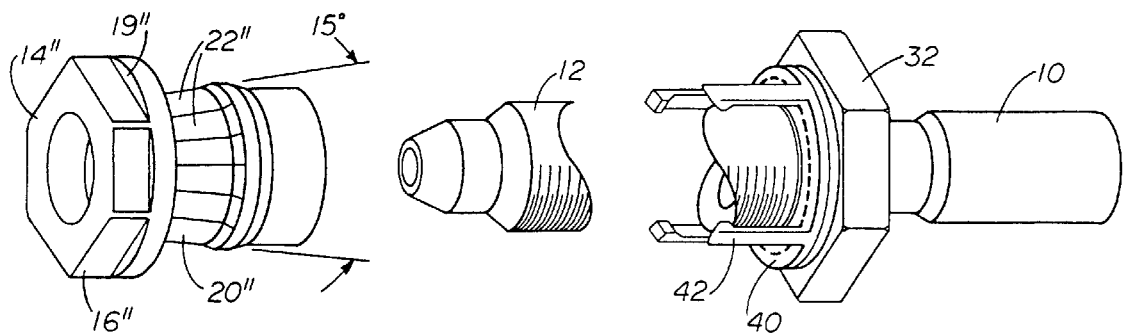
FIG. 6 illustrates modifications to the tangs and polygonal flats of the capture device of FIG. 1.

FIG. 6 illustrates further modifications to the nut 14 of FIG. 1. The nut 14" includes a flange 19" located between the hexagonal portion 16" and the circumferential depressed groove 20". The flange 19" as shown is the same as or larger in diameter than the maximum point to point diameter of the hexagonal portion 16". The flange 19" prevents slippage of a wrench from the hexagonal portion 16" into the groove 20".

FIG. 6 also illustrates a modified groove 20". The modification comprises a truncated "conical" surface for the bottom of the groove 20" with the flats 22" forming the surface of the cone. As shown the cone is approximately 15°.

Figure 7A:
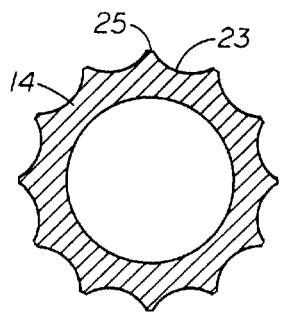
FIGS. 7a, 7b and 7c illustrate schematically alternate concave scallop, ratchet and double-scallop forms of the polygonal flats respectively.
Figure 7B:
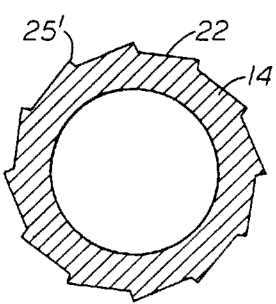
Figure 7C:
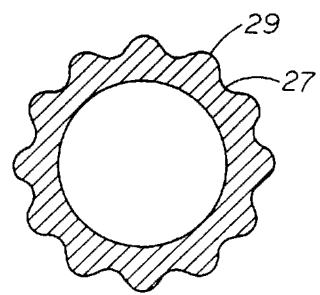

FIG. 7 illustrates optional configurations to the circumferential flats 22 in the depressed groove 20. In FIG. 7a the polygonal shape is scalloped to form concave surfaces 23 about the bottom of the groove 20. The junctures 25 between the scallops 23 provide a more pronounced ratcheting effect between the knobs 44 and the junctures 25 whether the nut 14 is turned clockwise or counter-clockwise. In FIG. 7b, however, the groove bottom retains the polygonal flats 22 but with a one-way ratchet configuration at the junctures 25'. For most applications the configuration shown in FIG. 7c is preferred. The FIG. 7c shape comprises alternating concave 27 and convex 29 smoothly joined scallops. The smoothly joined scallops are formed of substantially semi-cylindrical surfaces and provide a ratcheting effect in either direction.

Figure 8A:
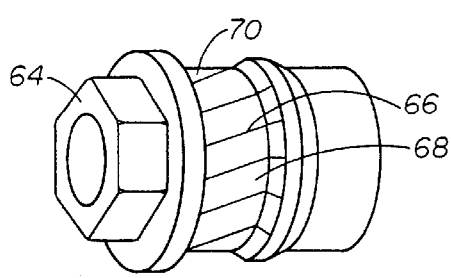
FIGS. 8a and 8b illustrate two additional modifications of the polygonal-flats.

FIG. 8a illustrates a nut 64 modified to provide a preferential turning direction but nevertheless permitting the nut to turn in either direction. As shown the junctures 66 between the flats 68 are biased relative to the axis of the nut 64 thereby providing a twist to the placement of the flats about the groove 70. Depending on the bias relative to the thread direction of the nut, the engagement of the tangs with the flats 68 will cause the torque required to turn the nut in one direction to differ from the torque required to turn the nut in the other direction.

Figure 8B:
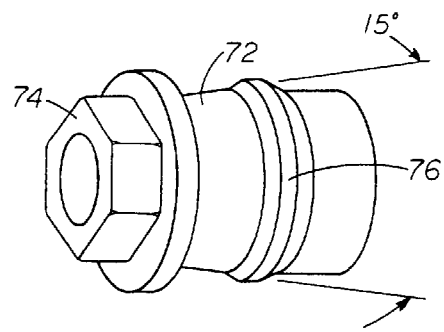
Figure 9:
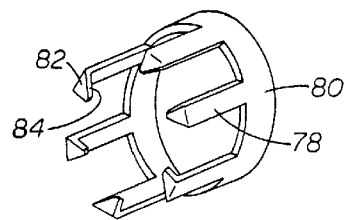
FIG. 9 illustrates modified tips on the tangs to provide relatively increased resistance to removal.

In FIG. 8b the groove 72 of the nut 74 is conical and smooth without junctures. The cone is about 15° as indicated. The tangs engage the conical surface 72 without a ratcheting effect, however, the shoulder 76 is retained together with the conical surface and provides resistance to disassembly. Thus, the nut 74 is applicable to less rigorous assemblies, however, by eliminating the flats, the nut is less expensive to manufacture. FIG. 9 illustrates a modified tang assembly comprising six tangs 78 extending from a ring 80. The knobs 82 at the ends of the tangs 78 may be formed as in FIG. 1 or as shown in FIG. 9 wherein the knobs are asymmetric 84 to the tangs. The asymmetric knobs 82 provide a preferred direction for the ratcheting. Although four and six tang rings are illustrated above, most applications utilize substantially more tangs, such as ten to twenty. However, for purposes of clarity lesser numbers of tangs are shown.

Figure 10:
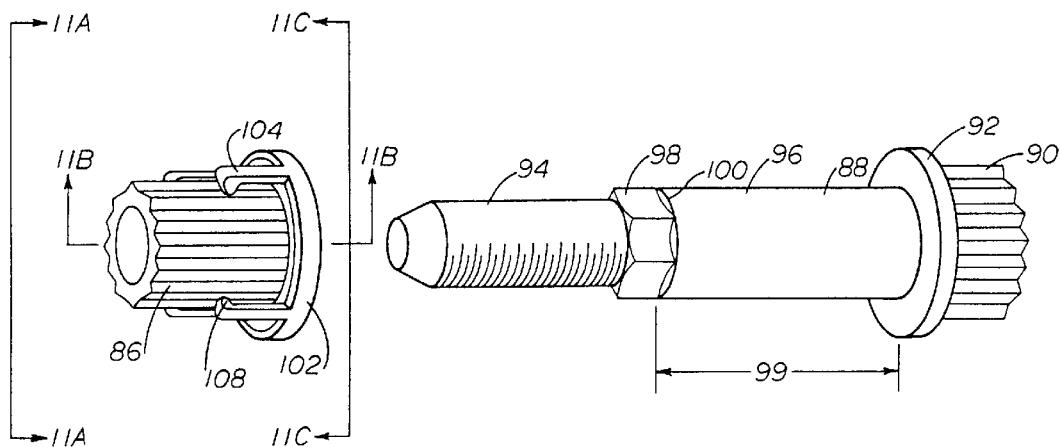
FIG. 10 is an exploded view of an alternate bolt form of the capture device with the tangs mounted on a twelve point nut.

FIG. 10 illustrates a free spinning nut 86 and bolt 88 combination. The bolt head 90 and nut 86 have a twelve point exterior configuration common on aircraft engines. The head 90 includes an integral flange 92. Between the threaded portion 94 and the shank 96 is a circumferential band comprising a plurality of concave scallops 98. The working length 99 of the bolt 88 is slightly greater than the distance between the flange 92 and the inner edge 100 of the scallop band 98.

Figure 11A:
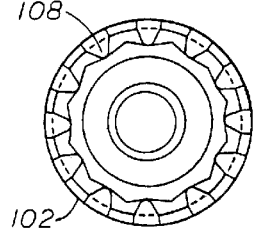
FIGS. 11a, 11b and 11c are views taken in the directions 11a—11a, 11b—11b and 11c—11c respectively in FIG. 10.
Figure 11B:
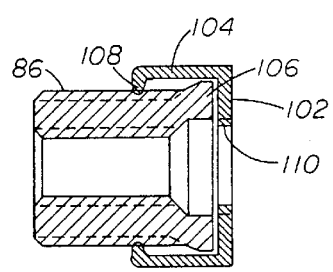
Figure 11C:
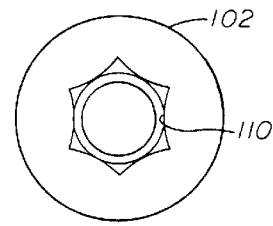

As is also shown in FIGS. 11a, 11b and 11c the nut 86 includes a ring 102 having a plurality of tangs 104 extending parallel to the axis of the nut. The tangs 104 extend over a shoulder 106 integral with the nut 86. Knobs 108 formed on the ends of the tangs 104 after assembly to the nut 86 engage the twelve point exterior of the nut for the ratcheting effect. Although only four tangs and knobs are shown, as many as twelve may be used as illustrated in FIG. 11a. As best shown in FIG. 11c the ring 102 has a scalloped bore 110 complementary to the band 98. The scalloped bore 110 is sufficiently large to clear the outside diameter of the threads 94 of the bolt 88. Normally the outside diameter of the band 98 is equal or less than the diameter of the shank 96.

In use the ring 102 and tangs 104 free spin with the nut 86 on the threads 94. Upon engagement of the complementary scallops 110 and 98 the ring and tangs are prevented from rotation with the nut 86. The ratchet effect between the knobs 108 and the twelve point surface on the nut permits the nut 86 to be turned only with sufficient torque to overcome the ratchet effect. Thus, the nut 86 can only be fully tightened or loosened with wrenches and inadvertent loosening absent tools cannot occur. Since the flexing of the tangs 104 is kept well within the elastic limit of the material and preferably within the fatigue limit of the material the nut and bolt combination can be assembled and disassembled a large number of times without degradation because the capture device is not degraded by the flexing of the tangs.

Rather, failure eventually results from frictional wear at the contact of the tang knobs with the junctures between the flats or concave scallops. Thus, suitable means of hardening the knobs and the polygonal surface are applicable. Such treatments might be diffusion treatments, plating or hard surfacing. For aircraft applications, the bolt, nut and capture device are expected to be titanium, Inconel or similar strong and hard materials that are also very wear resistant. The device is, however, not limited to such materials.

Figure 12:
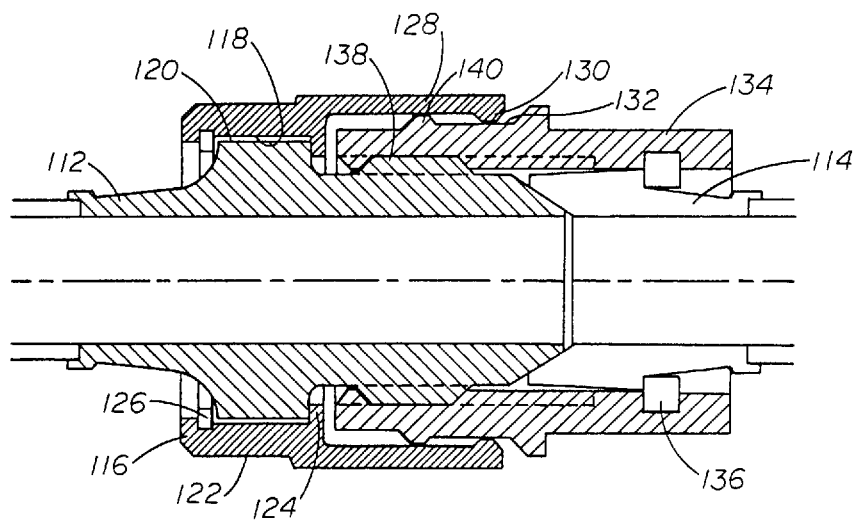
FIG. 12 illustrates schematically a retro-fit in-line fluid coupling with the new capture device.

FIG. 12 illustrates a retro-fit in-line fluid fitting replacement. The conventional coupling 112 and ferrule 114 are retained and the original nut removed. The locking ring 116 has an internal bore 118 complementary to the hexagonal exterior 120 of the coupling 112. The exterior 122 of the locking ring 116 is likewise hexagonal. The locking ring 116 is axially positioned by an interior shoulder 124 and a retaining ring 126. A plurality of tangs 128 extend axially from the locking ring 116 and include knobs 130 adapted to engage a plurality of flats 132 on the nut 134. The retro-fit nut 134 is slipped over the ferrule 114 and retained by a square or round thrust wire 136. Coupling and tightening the threaded engagement 138 causes the knobs 130 to first engage and pass over the shoulder 140 with attendant flexing of the tangs 128. The knobs 130 then engage the flats 132 and with further rotation of the nut 134 the seal is made at 142. As above with wrenches the locking ring 116 and nut 134 can be assembled and disassembled a large number of times without degradation, however, the device cannot inadvertently loosen absent tools.

Figure 13:
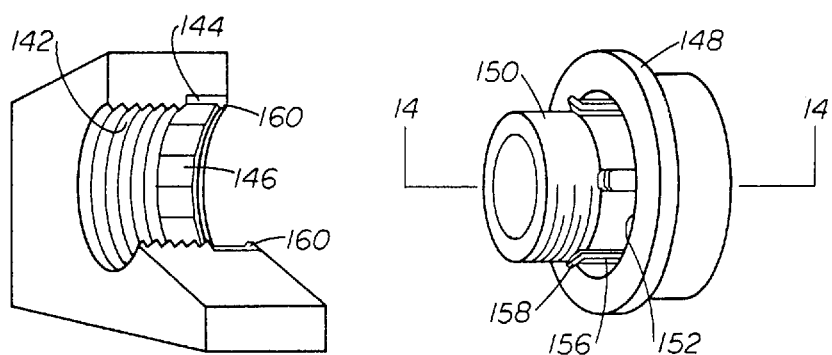
FIG. 13 illustrates in exploded view a self-locking hole plug wherein the scalloped polygonal surface comprises an internal circumference and the tangs flex radially inward.
Figure 14:
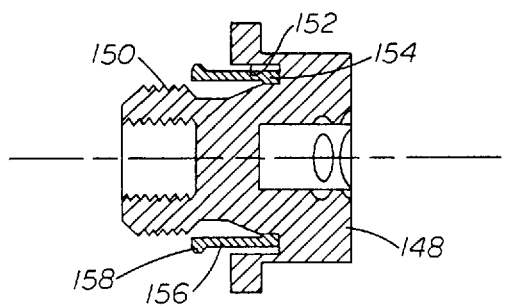
FIG. 14 illustrates in cross-section the attachment of the tangs to the hole plug.

Illustrated in FIGS. 13 and 14 is a self-locking borescope plug employing the capture device. In this embodiment the borescope socket 142 is counterbored and fitted with a hard ring 144. The ring 144 is formed with internal scallops or flats 146. The borescope plug 148 includes a threaded portion 150 for engagement with the threaded socket 142. The plug 148 is formed with annular depression 152 into which is inserted a non-rotatable ring 154 having a plurality of tangs 156. As distinguished from the embodiments above the knobs 158 extend radially outwardly from the tangs 156. As the plug 148 is engaged with the socket 142 the tangs 156 flex radially inwardly as the knobs 158 engage the shoulder 160 on the hard ring 144. With further engagement the knobs 158 engage the scallops 146 to thereby prevent inadvertent rotation absent tools. The hard ring 144 may be press fit, staked or otherwise fastened permanently to the socket 142. The tang ring 154 may also be suitably fastened permanently in the depression 152 by press fit, staking or other permanent means. As an alternative, the annular depression 152 may be replaced by a plurality of individual holes in a circular pattern. In each hole a tang is staked or press fit.

In particular for some retrofit applications, the hard ring 144 may be installed in or formed in a "key type" threaded insert which is in turn installed in the socket 142. Thus, for such applications the plug 148 may be installed by implementing an installation procedure similar to currently established thread repair procedures.

As a further alternative, a tang ring may be press fit into the counterbore in the socket and a complementary hard ring with the shoulder and concave scallops press fit to the plug. As is clear from the above disclosures for particular applications the knobs on the tangs may face inwardly or outwardly, the polygonal or scalloped surface may face inwardly or outwardly and either the female or male member may have the tangs or engaging surface.

Figure 15:
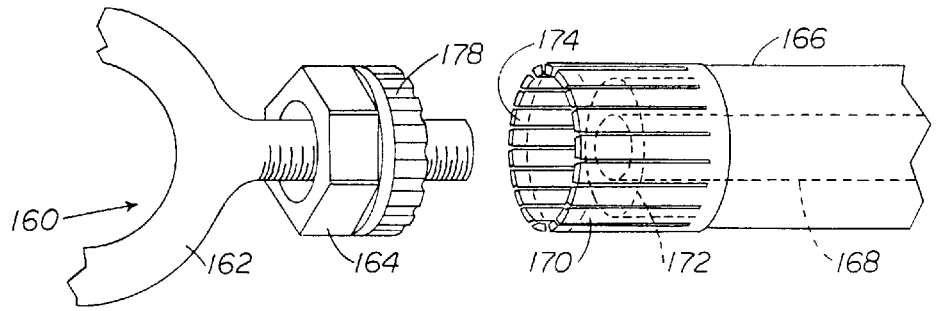
FIG. 15 illustrates in perspective view the capture device modified for use with a turnbuckle.

Illustrated in FIG. 15 is a turnbuckle head generally denoted by 160. The head 160 includes a threaded eye bolt 162 and nut 164 threaded thereon. The turnbuckle shaft 166 includes a threaded hole 168 sized to receive the threaded eye bolt 164. A capture device 170 is non-rotatably affixed to the end 172 of the shaft with the tips 174 of the tangs 176 extending therebeyond.

The nut 164 includes a plurality of concave scalloped detents 178 adapted to engage the tips 174 of the capture device 170 and thereby prevent the nut 164 from rotationally loosening from vibration once the nut 164 is tightened against the end 172. The tangs 176 and tips 174 are sized to flex slightly outwardly with the engagement; however, with the deletion of a shoulder adjacent the detents 178, the required amount of flex is minimized and therefore much stiffer tangs 176 can be used. With the scalloped detents 178, this configuration prevents inadvertent loosening of the nut 164 from the capture device 170 or the end 172.

Figure 16:
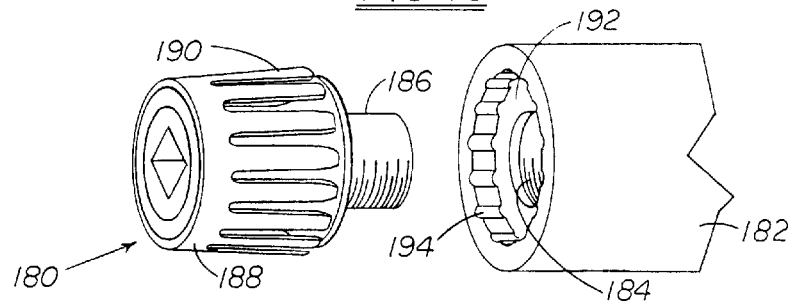
FIG. 16 illustrates in exploded perspective a modified capture device on a drain or borescope plug.

Illustrated in FIG. 16 is a drain plug or borescope plug generally denoted by 180 and a receptacle 182 having a threaded port 184 therein. The plug 180 includes a threaded tip 186 engageable with the threaded port 184. The head of the drain plug 180 is formed to accept a press fit capture device 188 having a plurality of tangs 190. The tangs 190 are flexible as above. In unflexed position, the tangs 190 form a slight outward cone expanded toward the threaded tip 186.

The threaded port 184 is counterbored and the counterbore 192 is press fitted with a ring 193 formed with a plurality of internal scalloped detents 194 adapted to engage the tangs 190. The tangs 190 flex radially inward with engagement. No tips on the tangs and no shoulder adjacent the detents are required for an effective engagement because a stiffer tang can be used and the concave scalloped detents are very effective at preventing any inadvertent loosening of the plug 180.

Figure 17:
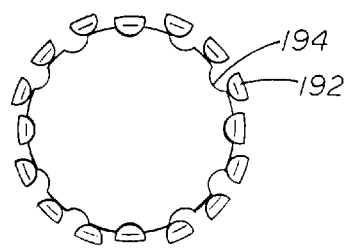
FIG. 17 illustrates in end view engagement of the tangs with an unequal umber of scalloped detents.

Illustrated in FIG. 17 is a mismatch of the number of tangs 192 and detents 194. In particular, if the tangs 192 number 16 and the number of scalloped detents number 12, four tangs fully engage at every 7.5° of relative rotation. Thus, with full tightening of the associated fittings, back off from full tightness is limited to no more than 3.75° before four tangs fully engage. This can be compared to an equal number of 12 for both tangs and detents where back off can be as much as 30° before the tangs fully engage. Although most embodiments of the capture device use substantially more tangs than four, four tangs have been found more than sufficient in practice where the material used is titanium or a specialized hard alloy.

Figure 18:
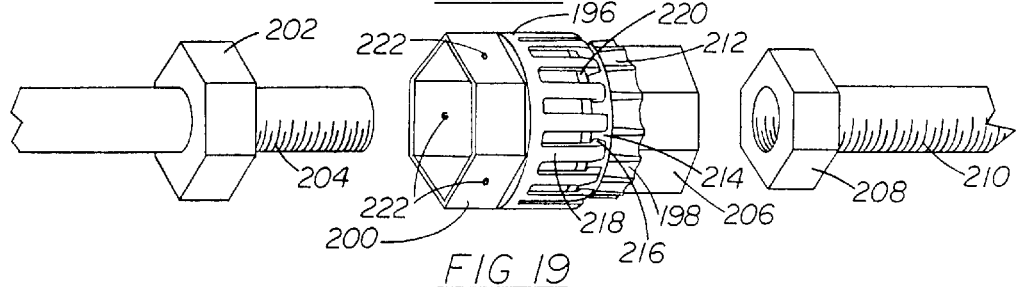
FIG. 18 illustrates in exploded perspective the capture device complementary engagement, rotatable but axially retained permanently.

FIG. 18 illustrates a capture device wherein, once assembled, the tang portion 196 cannot be fully disassembled from the detent portion 198. In this embodiment, the tang portion 196 is formed with a hexagonal sleeve 200 adapted to fit over a drive hex 202 on a coupling part 204. In similar manner, the detent portion 198 includes a hexagonal sleeve 206 adapted to fit over a hexagonal nut 208 on the other coupling part 210.

The detents 212 on the detent portion 198 are terminated by a cylindrical section 214 of width in the axial direction sufficient to freely accept the tips 216 of the tangs 218, the tips facing and extending radially inwardly. The cylindrical section 214 spaces a shoulder or flange 220 from the detents 212. The diameter of the flange 220 is sufficient to force the tangs 218 to flex thereover in assembling the tang portion 196 to the detent portion 198; however, the diameter of the cylindrical section 214 is sufficiently small to allow the tang portion to freely rotate on the detent portion when the tips 216 are thereover.

When the coupling parts 204 and 210 are initially rotatably assembled together, the tang portion 196 freely rotates on the detent portion 198 initially. But as the coupling parts 204 and 210 are tightened together, the tang tips 216 are forced into engagement with the detents 212. Although the capture device of FIG. 18 can be used without permanent attachment to either drive hex 202 or nut 208, preferably the capture device is permanently or frictionally (semi-permanently) attached to one of the drive hex or nut. Thus, several of the flats on hexagonal sleeve 200 may be dimpled as shown at 222 to cause a frictional fit with drive hex 202 that is sufficient to prevent the capture device from disengaging from drive hex 202 when the coupling parts 204 and 210 are disengaged. None of the coupling or capture device parts is thereby fully disassembled and possibly dropped or lost.

Figure 19:
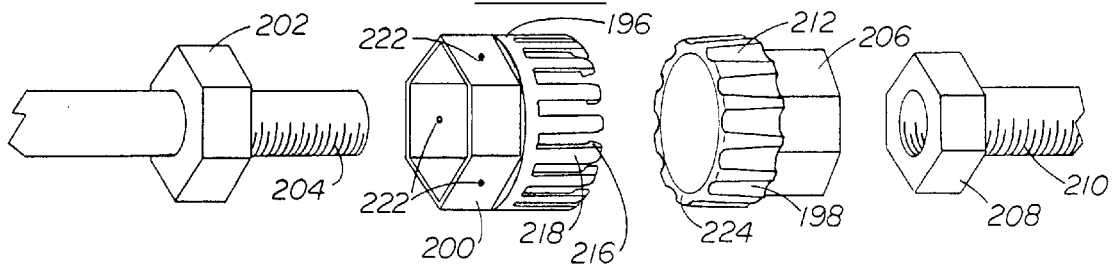
FIG. 19 illustrates in exploded perspective the capture device of FIG. 18 in detachable configuration.

Illustrated in FIG. 19 is an alternative form of the capture device in FIG. 18. In FIG. 19, the coupling parts 204 and 210 and the drive hex 202 and nut 208 thereon may be the same as are the hexagonal sleeves 200 and 206 respectively. The tangs 218 may be formed with tips 216 or the tips deleted; however, the detents 212 extend to the end 224 of the detent portion 198 with no flange or cylindrical section. Thus, the tang portion 196 and the detent portion 198 can be completely separated. Preferably in this embodiment both hexagonal sleeves 200 and 206 are permanently or semi-permanently attached to the drive hex 202 and nut 208 respectively.

In the embodiments of FIGS. 18 and 19, the detents 212 are concave scalloped. They preferably are further shaped in the manner shown in FIG. 20. The peaks 226 appear somewhat triangular and are portions of a cone as indicated by the ghost line 228. The detents 212, however, are formed as portions of cylinders having axes all parallel to the axis of the detent portion 198. This modification has been found to be particularly effective at eliminating any vibration of the sleeves 200 and 206 on the drive hex 202 and nut 208 and further in preventing disengagement of the sleeves from the nuts when the tangs 218 are disengaged from the detents 212.

Figure 20:
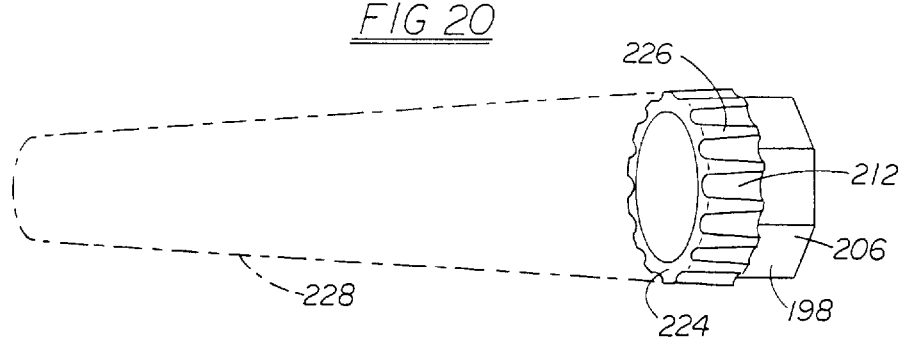
FIG. 20 illustrates the detent portion of the capture device modified to form conical peaks or junctures.

Further, the sleeves 200 and 206 are particularly well suited for installation on relatively soft materials such as aluminum drive hexes 202 and nuts 208. Absence of vibration prevents surface wear on soft metals. Metals such as aluminum also possess substantially different co-efficients of expansion from iron or nickel base alloys. Thermal cycling can cause the preload on a nut to be lost, and as a consequence, vibration to loosen the nut. The capture device of FIGS. 18, 19 and 20 is particularly suited for retrofitting of dissimilar metal drive hex and nut couplings.

Figure 21:
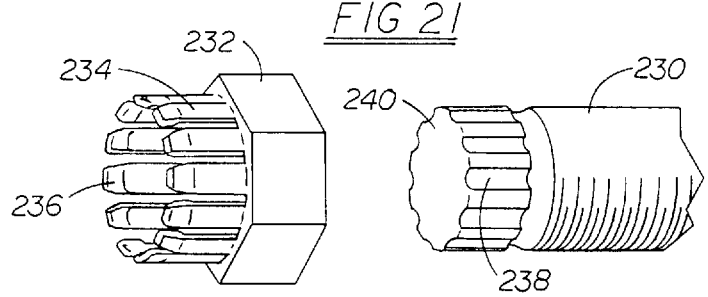
FIG. 21 illustrates in exploded perspective a lock-nut form of the capture device for use on a threaded stud.

Illustrated in FIG. 21 is a stud 230 and mating lock nut 232. The lock nut 232 is formed with a plurality of tangs 234 having tips 236 thereon. The tang tips 236 are adapted to engage a plurality of scalloped detents 238 formed in the extended end 240 of the stud 230. Thus, when the lock nut 232 is assembled to the stud 230, the tangs 234 flex with the engagement of the tips 236 to the detents 238. This particular embodiment is suited for joining parts where the parts must be kept free to swivel and the lock nut 232 cannot otherwise be tightened down against another object. The number of detents 238 may equal the number of tangs 234 or be unequal as shown in FIG. 17. This configuration is particularly useful when a castle nut and cotter pin cannot be used.

Figure 22:
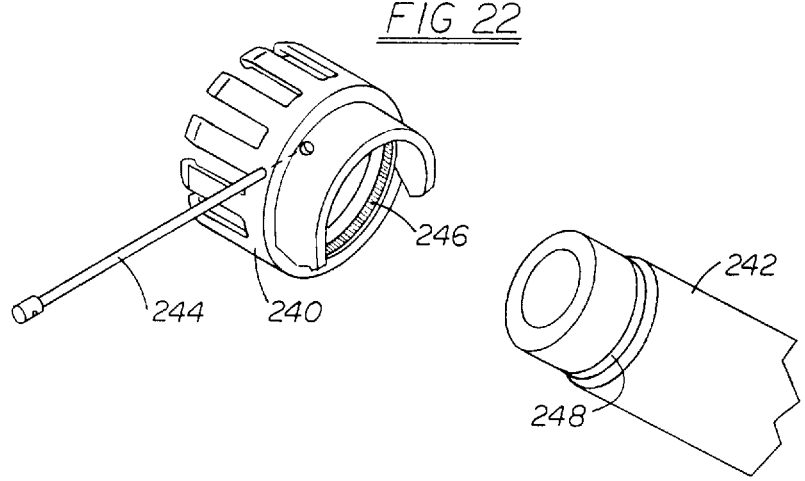
FIG. 22 illustrates in exploded perspective a thrust wire retention device for the capture device.

FIG. 22 illustrates a thrust wire means of attaching a tang portion 240 of a capture device to a coupling part 242. Upon assembly of the tang portion 240 to coupling part 242, the thrust wire 244 is driven around the channel 246 in the tang portion with thread relief groove 248 of the coupling part 242 in axial alignment with the channel. The thrust wire 244, by engaging both the channel 246 and relief groove 248, prevents axial disengagement of the tang portion 240 from the coupling part 242. The shroud 243 engages the curved portion of the D-section of coupling part 242 thereby preventing the tang portion 240 from rotating relative to the coupling part 242. The shroud 243 can be of any shape necessary to mate with the coupling part 242.

Figure 23:
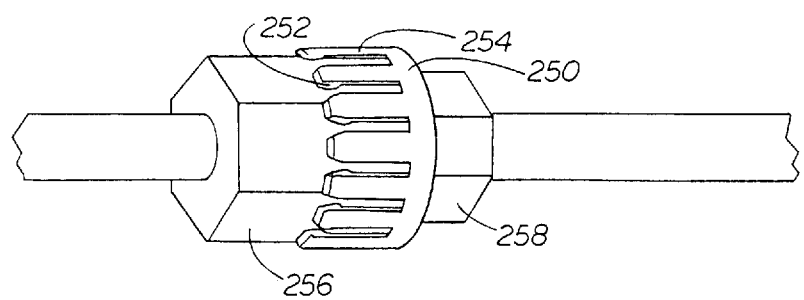
FIG. 23 illustrates in perspective the capture device engaged with a plain hex fitting.

FIG. 23 shows perhaps the simplest form of the capture device wherein the tang portion 250 has the tang tips 252 on the tangs 254 in direct engagement with the hexagonal nut 256 of the mating coupling part. The tang portion 250 is attached to the other coupling part with a hexagonal sleeve 258 as described above. With 16 tangs 254 engaging the hexagonal nut 256, the rotational back off in actual practice has been found to be virtually nil.

Figure 24:
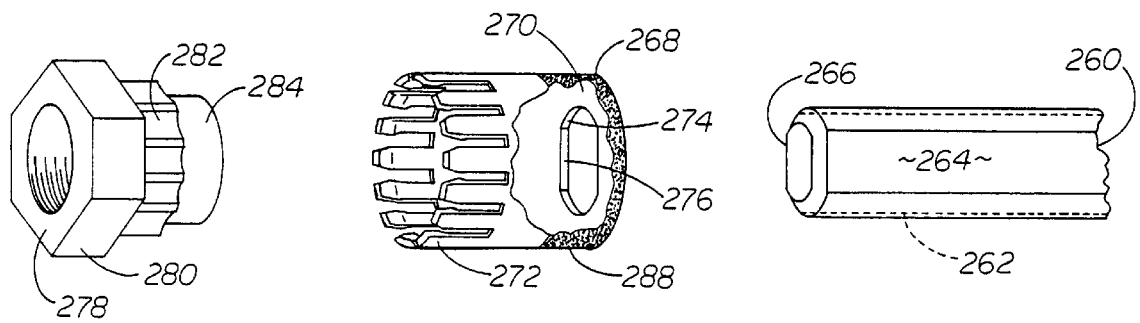
FIG. 24 is an exploded and partially cut-away view of the capture device applied to a long bolt or threaded rod and nut.

FIG. 24 shows in exploded and partially cut-away view a bolt end or threaded rod fastener 260 of indefinite length. In addition to the threads 262 at least one flat 264 extends axially along the rod 260. In the embodiment shown a second axial flat 266 is located diametrically opposite the flat 264.

The tang portion 268 comprises a thrust washer 270 integrally formed with a plurality of axially extending tangs 272 to create a generally cylindrical or slightly conical cup shaped appearance. The thrust washer aperture 274 is sized diametrically to pass over the threaded rod 260 but includes diametrically opposite flats 276 which engage the threaded rod flats 264 and 266 thereby preventing any rotation of the tang portion 268 relative to the threaded rod. Although flats are shown in this embodiment, any other suitable means such as a spline or keyway to prevent relative rotation but allow axial relative movement might be substituted.

Also shown in FIG. 24 is a nut 278 threadable on the rod 260 with conventional hexagonal or other tool engaging means 280 and adjacent thereto on the nut is a plurality of scalloped detents ("flats") 282 such as shown above in FIG. 7A. The nut 278 may be formed with a smaller cylindrical lead-in portion 284.

Figure 25:
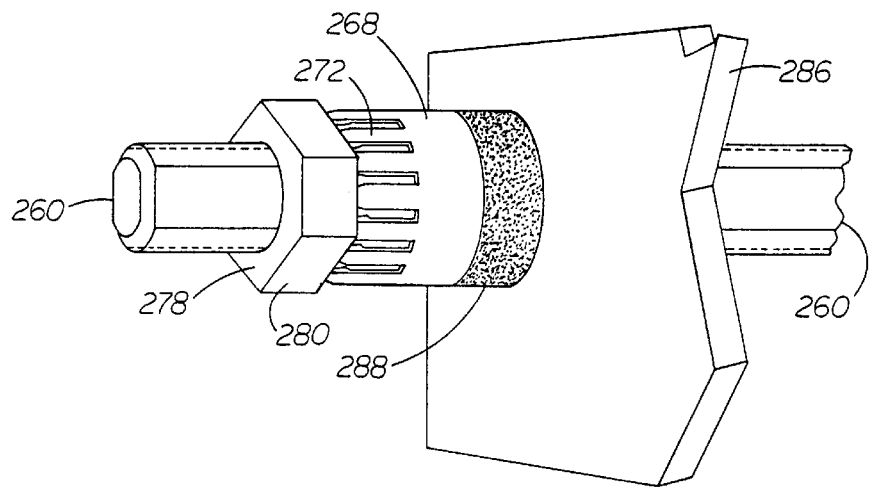
FIG. 25 illustrates the assembled embodiment of FIG. 24.

In FIG. 25 the bolt or rod end 260, tang portion 268 and nut 278 are shown assembled against a part 286 through which the bolt or rod end extends. With the thrust washer 270 seated against the part 286 and the nut 278 rotated into engagement of the tangs 272 by the scalloped detents 282, the nut 278 cannot rotate unless positively rotated by a tool engaging the means 280. The effect is to decouple the nut 278 from any frictional forces that might otherwise loosen the nut if the bolt or rod end 260 is forcefully rotated. Thus, forcefully rotating the bolt or rod does not loosen the seated tang portion 268 and engaged nut 278.

Since seating can occur at any location along the thread 262, this embodiment of the capture device is particularly advantageous for application to hose and duct clamps where the precise seating location on the tightening bolt is not predetermined. Another important application is to threaded rod turnbuckles where a locking nut is required.

In certain critical applications failure is considered by the applicant to be any relative rotation between the nut 278 and tang portion 268 equal or more than the circumferential distance between adjacent scalloped detent's 282 or typically about 7½° absent application of a tool to the nut. Such relative rotation is not induced by rotation of the bolt or rod because of the decoupling noted above.

Application of a wrench to the nut 278, however, allows for easy disassembly because the tang portion 268 tends to very slightly cock on the bolt or rod end 260 and thereby resist axial movement until the nut 278 fully disengages. As an option the exterior of the tang portion 268 may be provided with a knurled exterior surface or other engagement means to provide a tool gripping means 288 to resist axial movement as the nut 278 is withdrawn from engagement with the tang portion. This gripping means 288 may also be of particular importance in threaded rod applications where there may be no other means to grip the rod and thereby prevent rotation of the rod without damaging the threads. Also, where there is no access to a bolt head the bolt may be prevented from rotating by applying a tool to the gripping means 288.

I claim:

1. A capture device and threaded fastener combination comprising a plurality of tangs extending substantially in parallel longitudinally and axially, a thrust washer, said tangs attached at one end of each tang to the thrust washer adjacent the periphery of the thrust washer to form a single integral tang portion, a threaded fastener portion configured for mounting of the tang portion thereon with substantially free relative axial movement of the tang portion and threaded fastener portion therebetween, interengaging means between the tang portion and threaded fastener portion preventing relative rotational motion therebetween upon mounting, a complementary threaded fastener portion formed with a detent portion comprising a plurality of detents separated by peaks in a substantially cylindrical configuration, said plurality of tangs flexing longitudinally in engagement with the detent portion as the threaded fastener portions are rotationally engaged and as the tangs ratchet over the peaks between the detents, said plurality of tangs caused to engage with the detent portion by resistance to axial movement of the tang portion in response to seating of the tang portion thrust washer.

2. The capture device and threaded fastener combination of claim 1 including tool gripping means on the tang portion.

3. The capture device and threaded fastener combination of claim 1 wherein the plurality of tangs are substantially in parallel in unflexed condition and form in flexed condition a slightly conical configuration upon engagement with the plurality of detents.

4. The capture device and threaded fastener combination of claim 1 wherein the detents are concave scalloped in shape and the tang tips are substantially complementary thereto.

5. The capture device and threaded fastener combination of claim 1 wherein the plurality of tangs extending substantially in parallel form in unflexed condition a slightly conical configuration wherein upon engagement with the plurality of detents the tangs are flexed into a more parallel condition.

* * * * *